(12) United States Patent
Pulido et al.

(10) Patent No.: US 11,562,658 B2
(45) Date of Patent: Jan. 24, 2023

(54) EI AUTHORING TOOL PATENT

(71) Applicant: eLearning Innovation, LLC, Milford, NH (US)

(72) Inventors: Laurie Pulido, Hampton (AU); Ron Dinwiddie, Ashburn, VA (US); Daniel Del Rio, Seminole, FL (US)

(73) Assignee: eLearning Innovation, LLC, Derry, NH (US)

( * ) Notice: Subject to any disclaimer, the term of this patent is extended or adjusted under 35 U.S.C. 154(b) by 685 days.

(21) Appl. No.: 16/396,410

(22) Filed: Apr. 26, 2019

(65) Prior Publication Data

US 2020/0342776 A1 Oct. 29, 2020

(51) Int. Cl.
*G09B 7/00* (2006.01)
*G06F 9/54* (2006.01)

(52) U.S. Cl.
CPC ........ *G09B 7/00* (2013.01); *G06F 9/54* (2013.01)

(58) Field of Classification Search
CPC .................................. G09B 7/00; G06F 9/54
See application file for complete search history.

(56) References Cited

U.S. PATENT DOCUMENTS

| 6,293,802 | B1 * | 9/2001 | Ahlgren | G09B 5/02 |
| | | | | 434/252 |
| 8,454,419 | B1 * | 6/2013 | Smith | G09B 5/00 |
| | | | | 434/72 |
| 2017/0291295 | A1 * | 10/2017 | Gupta | G09B 19/0053 |
| 2019/0043380 | A1 * | 2/2019 | Clarke, IV | G09B 5/12 |

OTHER PUBLICATIONS

Why Learning Tool Interoperability Should Be Part Of Your eLearning Application, retrieved from the internet: https://elearningindustry.com/learning-tool-interoperability-part-elearning-application, Aug. 16, 2014. (Year: 2014).*

IMS Global Learning Tools Interoperability™ Basic LTI v1 Implementation Guide _ IMS Global Learning Consortium, retrieved from the internet: https://www.imsglobal.org/specs/ltiv1p0/implementation-guide, May 17, 2010. (Year: 2010).*

* cited by examiner

*Primary Examiner* — Eddy Saint-Vil

(57) ABSTRACT

A system for creating educational assessments from content files using an API and inserting the educational assessments into learning programs using tokens.

14 Claims, 8 Drawing Sheets

EI AUTHORING TOOL PATENT

TECHNICAL FIELD

The present teaching is related to the field of online learning and more particularly, to an online learning system and method which is configured to design, deliver, measure, track, and manage educational courses and programs.

BACKGROUND

Since the advent of the Internet, there has been a consistent movement to capitalize on utilization of the "online" space to make learning more efficient. This online learning could apply to the public school system, higher education, or private corporate trainings. In fact, a specific field of technology, dubbed "educational technology," has emerged to meet the needs and requirements for online learning.

There are a variety of educational technology products on the market already. The most prominent are Learning Management Systems (LMS), which provide an online classroom environment in which students interact with professors and each other, take tests, and submit assignments. Most LMSs also include some sort of content management system so that course content can be uploaded and stored virtually. An important function of LMSs is to allow an instructor to easily create assessments. In turn, it is important for LMSs to provide ways for a learner to easily attempt assessments. In short, LMSs allow for the management of content and its delivery to learners and instructors of those learners.

A notable advantage to delivering educational content in an online environment is the ability to measure and track data points. The exact measures can vary, whether they are around learner retention, graduation rates, average grades, or other metrics. Irrespective of what the exact measures are, however, the measurement of these data points provides institutions/companies with the ability to assess the effectiveness and quality of their educational system. It can also assist them in pinpointing areas for improvement. LMSs provide various ways to measure these data points. Alternatively, data measurement and presentation can be done through add-ons to the LMS or even in some instances independent software.

Unfortunately, however, the current state-of-the-art online learning management systems, with or without independent software, do not do not provide means to create assessments and add them to a curriculum in a fast and targeted way. Also, current LMSs do not provide a means to turn a folder of web content in to an assessment and integrate it with the LMS, integrating it with the LMSs web content.

Accordingly, what is needed is a learning management system that takes a novel and holistic approach to learning management by combining the content serving of an LMS with the ability to define and measure (assess) specific data points. An LMS is needed that provides tools by which an instructor can quickly and efficiently create assessments and integrate them with the LMS.

This application hereby incorporates the following related applications, in their entirety, by reference: pending U.S. patent application Ser. No. 16/135,850 filed Sep. 19, 2018, which in turn is a continuation of pending U.S. patent application Ser. No. 14/974,318 filed Nov. 20, 2015, which in turn claims the benefit, under 35 USC § 119 (e), of U.S. Provisional Patent application No. 62/082,757 filed on Nov. 21, 2014, all of which are titled "Computerized System and Method For Providing Competency-Based Learning."

SUMMARY

The needs set forth herein as well as further and other needs and advantages are addressed by the present embodiments, which illustrate solutions and advantages described below.

The system of the present embodiment includes, but is not limited to the following embodiments.

In one embodiment, a software tool for interchangeably embedding an educational assessment in a learning application comprises a server, a learning application executing on the server, the learning application built using the Learning Tools Interoperability Standard (LTI), an educational assessment executed by the learning application and configured to assess the abilities of a first user based upon inputs from the first user, and the educational assessment outputting an educational assessment outcome to the learning application.

The software tool further comprises a token in the learning application configured to store information regarding the educational assessment. Further, the learning application reads the information stored in the token, determines the educational assessment assigned to the token based upon the information stored in the token, and executes the educational assessment assigned to the token. The educational assessment assigned to the token can be changed without moving or modifying the learning application.

The software tool also comprises the learning application receiving the educational assessment outcome, producing a learning application outcome based upon at least the educational assessment outcome, and outputting the learning application outcome to a learning management system. The learning management system is executed on the server and generates a report using the learning application outcome.

In one embodiment, information identifying the location of the educational assessment is stored in the token and the learning application uses the information identifying the location of the token to retrieve the token from a digital storage.

In one embodiment, the token is placed in the learning application by adding the token to a learning application file.

In one embodiment, the information regarding the educational assessment is stored in multiple tokens and the learning application reads the information in at least a first token and a second token.

In one embodiment, the software tool also has a learning management system. The learning management system interacts with the learning application.

In one embodiment, the learning application of the software tool has an LTI tool provider. The learning management system interacts with the learning application through the LTI tool provider.

In one embodiment, the learning management system of the software tool transmits content requests to the LTI tool provider.

In one embodiment, the learning management system of the software tool receives outcomes from the LTI tool provider.

In one embodiment, the software tool for interchangeably embedding an educational assessment in a learning application further comprises a second educational assessment executed by the learning application and configured to assess the abilities of a first user based upon inputs from the first user. The educational assessment outputs an educational assessment outcome to the learning application. The software tool further comprises a second token, the second token configured to store information regarding the second educational assessment, the learning application reading the information stored in the second token, determining the educational assessment assigned to the second token based upon the information stored in the second token, and executing the educational assessment assigned to the second token such that the educational assessment assigned to the second token can be changed without moving or modifying the learning application.

The software tool further comprises, the learning application receiving the second educational assessment outcome, the learning application producing a second learning application outcome based upon at least the second educational assessment outcome, the learning application outputting the second learning application outcome to a learning management system, and the learning management system executing on the server and generating a report using the second learning application outcome.

In one embodiment, the software tool for creating an assessment comprises a server; a content, the content including materials related to an assessment subject matter, a learning application executing on the server, and the learning application built using the Learning Tools Interoperability Standard (LTI). The software tool further comprises, an application programming interface (API) executed in the learning application, the application programming interface configured to adapt the content to an assessment framework, the assessment framework having instructions by which the learning application structures the assessment, the structured assessment including at least a question and a place for an input responsive to the question, and the application programming interface storing the assessment in digital storage.

In one embodiment, the assessment, when executed in the learning application, accepts an input responsive to the question and stores the input in the digital storage.

In one embodiment, the assessment stores the input in digital storage using a single script function.

In one embodiment, the learning application compares the input stored in digital storage to a grading key and determines an assessment outcome based upon the comparison. Further, the learning application stores the assessment outcome in digital storage.

In one embodiment, the application programming interface retrieves the assessment from the storage and transmits it to an LTI tool provider.

In one embodiment, the LTI tool provider transmits the assessment to a learning management system.

Other embodiments of the system and method are described in detail below and are also part of the present teachings.

DETAILED DESCRIPTION

The present teachings are described more fully hereinafter with reference to the accompanying drawings, in which the present embodiments are shown. The following description is presented for illustrative purposes only and the present teachings should not be limited to these embodiments. Any computer configuration and architecture satisfying the speed and interface requirements herein described may be suitable for implementing the system and method of the present embodiments.

In compliance with the statute, the present teachings have been described in language more or less specific as to structural and methodical features. It is to be understood, however, that the present teachings are not limited to the specific features shown and described, since the systems and methods herein disclosed comprise preferred forms of putting the present teachings into effect.

For purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail.

Generally, all terms used in the claims are to be interpreted according to their ordinary meaning in the technical field, unless explicitly defined otherwise herein. All references to a/an/the element, apparatus, component, means, step, etc. are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second," etc. for different features/components of the present disclosure are only intended to distinguish the features/components from other similar features/components and not to impart any order or hierarchy to the features/components.

To aid the Patent Office and any readers of any patent issued on this application in interpreting the claims appended hereto, Applicant that it does not intend any of the appended claims or claim elements to invoke 35 U.S.C. 112(f) unless the words "means for" or "step for" are explicitly used in the particular claim.

A notable advantage to delivering educational content in an online environment is the ability to create assessments and add them to a curriculum in a fast and targeted way. Using the system described herein, assessments can be associated with embed tokens and publishing destinations instead of directly inserted into projects in an LMS. Further, assessments can be created easily using an API to interpret and process a content file.

Figure 1:
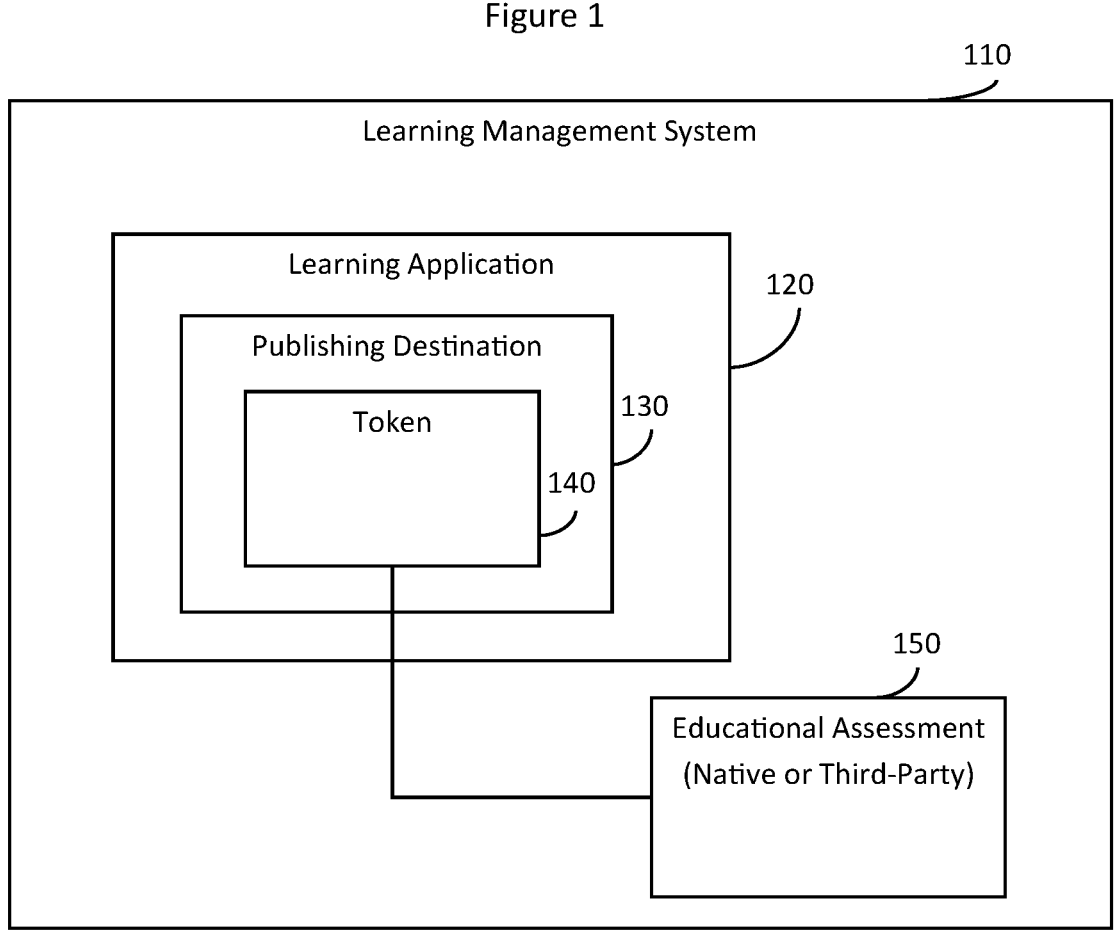
FIG. 1 shows an embodiment of a learning management system containing a token.

Referring to FIG. 1, an embodiment of a learning management system (LMS) 110 is shown. The LMS 110 can include a learning application 120 and an educational assessment 150. The learning application 120 can include a publishing destination 130; the publishing destination 130, in turn, can have a token 140. The LMS 110 can be on a server.

The server can be a personal computer, laptop computer, tablet computer, smart phone, or any other device known in the art that can execute software.

The token 140 can be mapped to the educational assessment 150. When a token 140 is mapped to an educational assessment 150, the token 140 can contain information necessary to identify the educational assessment 150 including, but not limited to, a file name, serial number, memory address, storage address, web address, or any other information known in the art to identify the location of data.

Figure 2:
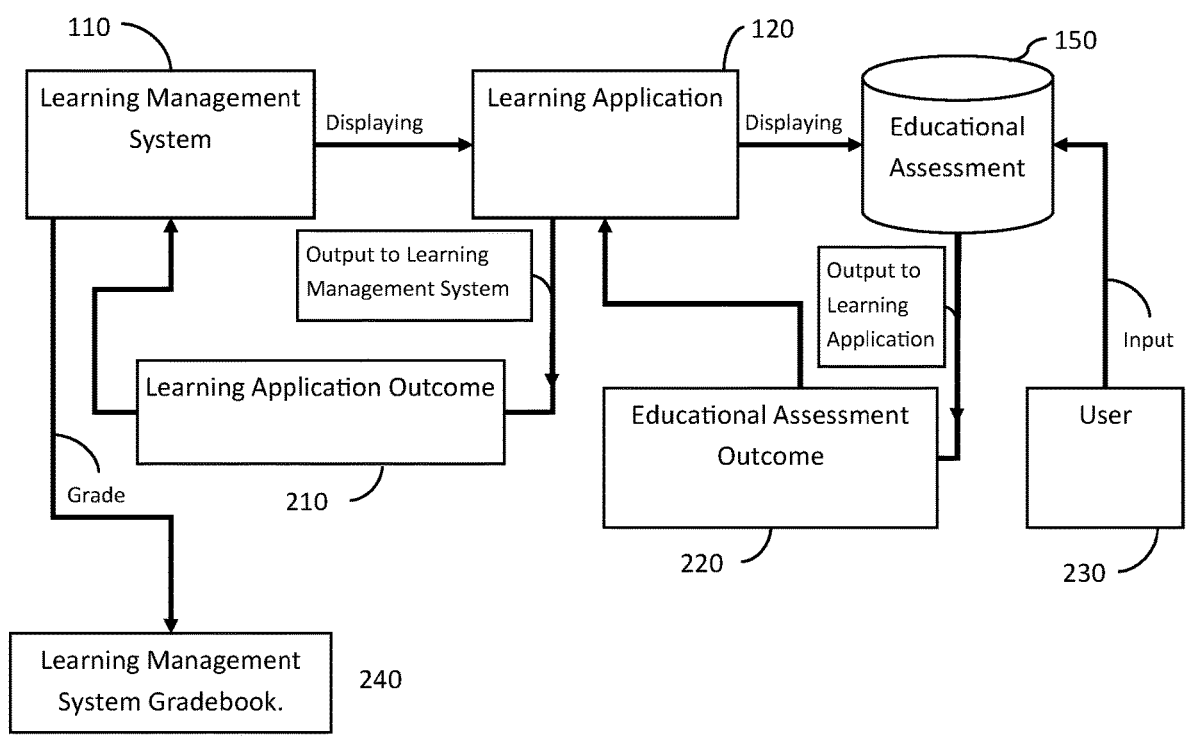
FIG. 2 is a depiction of the data flow of an embodiment of the system as it displays a learning application and produces a grade for record.

Referring to FIG. 2, an embodiment of the interaction between the learning management system 110 and its modules is shown. The LMS 110 can display the learning application 120. The learning application 120 can display the educational assessment 150. The educational assessment 150 can access input from a user 230. The educational assessment 150 can compare the input to a grading key and can output an educational assessment outcome 220 to the learning application 120. The learning application 120 can produce a learning application outcome 210 based upon the educational assessment outcome 220. The learning application 120 can transmit the learning application outcome 210 to the LMS 110. The LMS 110 can output a grade to the learning management system gradebook 240.

Figure 3:
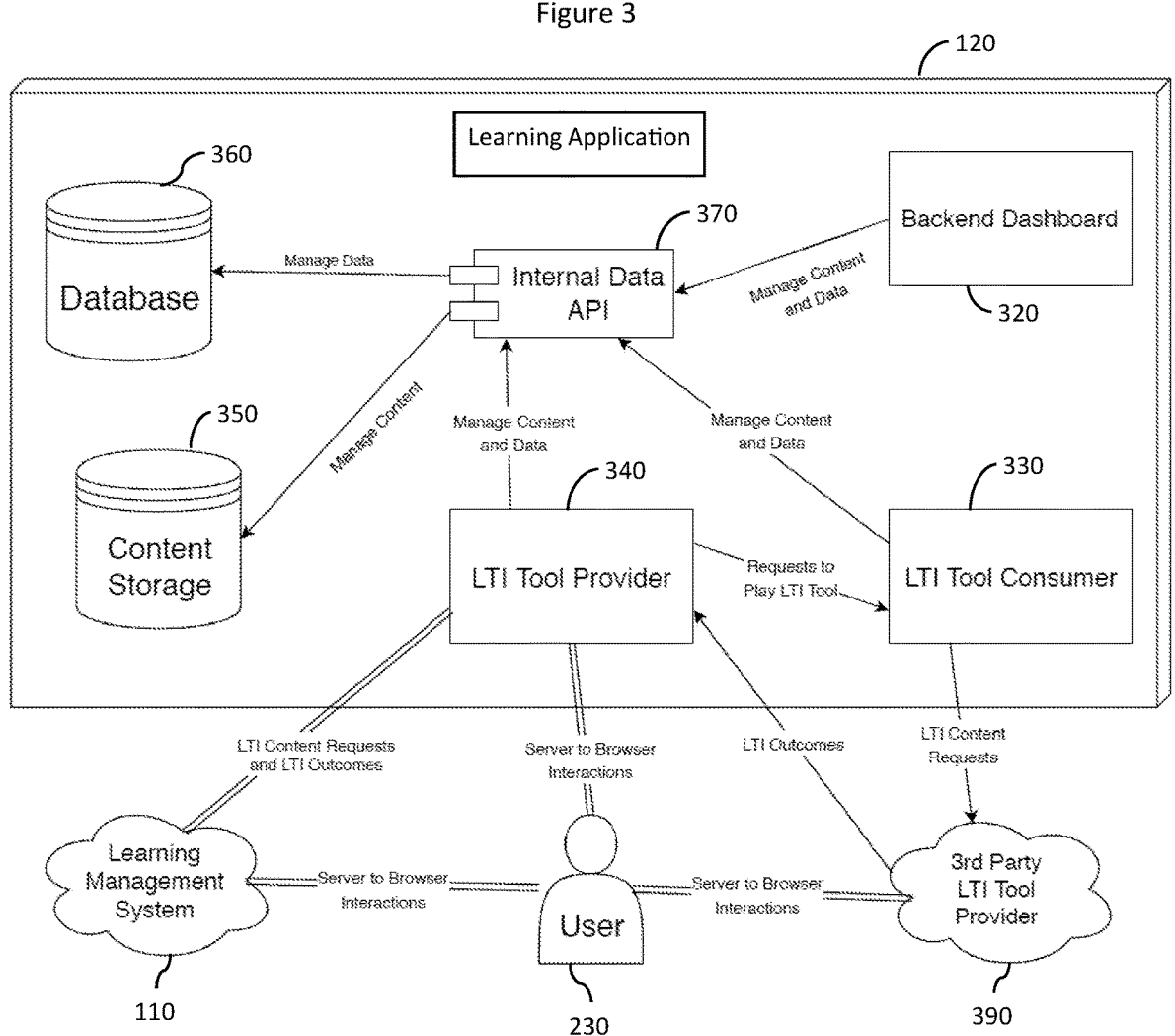
FIG. 3 shows an embodiment of the system illustrating a learning application and the modes of interaction between the learning application and exterior users and systems.

Referring to FIG. 3, the system can include a learning management system (LMS) 110 that interacts with a system having at least an internal data API 370, a database 360, content storage 350, a backend dashboard 320, LTI tool consumer 330, and an LTI tool provider 340. The system interacting with the LMS 110 can be a learning application with the components described above. A third-party LTI tool provider 390 can interact with the LTI tool consumer 330. A user 230 can interact with the LMS 380, the LTI tool provider 340, and the third-party LTI tool provider 340. The interaction between the user 230 and the LMS 110, LTI tool provider 340, and the third-party LTI tool provider 390 can be through server-to-browser interactions.

The learning application can be an integrated suite of web applications configured and designed to allow a user of a computerized system to design, deliver, measure, and manage educational content. The learning application can be a source control server for educational content that provides for an educator's educational content to be stored and allowing multiple users to edit the content. The learning application can also include a visual curriculum mapper. Additionally, the learning application can function as a content server, serving educational content into an LMS.

One example of the learning application, also referred to as the EASE system from eLearning Innovation LLC, is in U.S. patent application Ser. No. 16/135,850 filed Sep. 19, 2018, herein incorporated by reference, in its entirety.

LTI can be the Learning Tools Interoperability standard. The Learning Tools Interoperability Standard®, also referred to as LTI®, is a trademarked specification developed by IMS Global Learning Consortium. In LTI, rich learning applications, that may be hosted remotely and by a third party, are called tools and the LMS, or platforms like learning management systems, portals, learning object repositories and educational environments, are called tool consumers. The basic use case behind the development of the LTI specification is to allow the seamless connection of tools with platforms that present them to users.

The interaction between the LMS 110 and the LTI tool provider 340 can be LTI content requests and LTI outcomes. Interactions between the third-party LTI tool provider 390 and the LTI tool provider 340 can be LTI outcomes from the third-party LTI tool provider 390 to the LTI tool provider 340. Interactions between the LTI tool consumer 330 and the third party LTI tool provider 390 can be LTI content requests from the LTI tool consumer 330 to the third-party LTI tool provider 390.

Another embodiment of the system can include a client program. The client program can include a project, assessment, curriculum map, LTI link, rubric, analytic event, and LRS Datum. The project can include a publishing destination. The assessment can include an embed token. The LTI link can include a learning path, which in turn can include a module, which in turn can include a page. The rubric can include a demonstration criterion, which can in turn include a scale item.

The embed token of the assessment can link to a publishing destination. The link between the embed token and the publishing destination links the assessment to the project. When the project is executed, the assessment linked to the embed token can be executed in the project. The project can be a learning application.

The assessment can be created by the system according to the rubric and based on content uploaded to the client. The content can include materials related to the subject matter of the assessment and can be in the form of a file, web file, packet, array, matrix, comma separated values, or any other form of data organization known in the art. The client can create an assessment using the content and the rubric, the rubric including the demonstration criterion and the demonstration criterion including the scale item.

After the assessment is created, it can be placed into learning content. The content can include one or more publishing destinations. The assessment is placed in the content by associating, also known as mapping, the assessment with an embed token. The embed token can then be placed in the publishing location, thereby placing the assessment in the content. The content can be a learning application.

Each embed token can map to only one assessment. Each embed token can be mapped to only one publishing location. Each assessment can be mapped to multiple embed tokens. Each publishing location can map to multiple embed tokens.

In an embodiment of the system, a user accesses a learning management system (LMS), the LMS displays a learning tools interoperability (LTI) tool consumer, the LMS's LTI tool consumer plays an LTI tool provider, the LTI tool provider displays an LTI assessment, the LTI assessment displays an LTI tool consumer, the LTI tool consumer plays a third party LTI tool provider, the third party LTI tool provider reports a grade to the LTI tool consumer using LTI outcomes, and the LTI tool provider reports a grade to LMS's LTI tool consumer using LTI outcomes.

In an embodiment of the system, an assessment can be a quiz, survey, or a combination of a quiz and a survey. Quizzes are usually graded based on the answers responsive to questions included in the quiz. Surveys are usually ungraded or given a completion score. Answers responsive to quizzes and surveys can be stored in digital storage when an assessment is executed in a learning application.

Quizzes and surveys can include one or multiple questions. Each question can belong to only one quiz or one survey. Questions can be multiple choice, short answer, long answer, open-ended, or any other type of question known in the art. Multiple choice questions can have multiple answer choices. Each answer choice can belong to only one question.

In an embodiment of the system, media assessments can be created. Media assessments can be created by the system using a folder of content and an application programming interface (API). The system can take the folder of content, analyze it, determine the subject matter and practical meaning of the content, and apply the API to the content to create a media assessment consistent with the file of content and curriculum. The API can also create an assessment based upon a template or a framework. The API can determine how the media assessment is integrated with the content and the curriculum. The API can also can create the media assessment so that only a single script call, programmed in JavaScript, for example, is used to store a grade of an assessment attempt. The API can embed storyline presentations, SCORM packages with a SCROM driver, Adapt framework content, or any other custom content when creating the media assessment.

To create a media assessment, a user can access the LMS, the LMS can display its own LTI tool consumer, the LMS's LTI tool consumer can play the LTI tool provider, the LTI tool provider can display the media assessment, the media assessment can display the content package given to it when it was created with a JavaScript library injected into the content for use by the content, the content package can call the backend by using the JavaScript library injected into it at runtime, the backend can report the grade to LTI tool consumer using LTI outcomes, and LTI tool provider can report a grade to the LMS's LTI tool consumer using LTI outcomes.

In an embodiment, instructors can provide files to a learner through a file upload assessment. The learner can provide files to an instructor through an attempt at an assessment. All files submitted to the system can be stored in digital storage. Digital storage can be a local or remote hard drive, server storage, memory, cloud storage, removable-media storage, or any other device known in the art suitable to store computer-readable data.

In an embodiment, a user's browser can interact directly with the learning management system, the learning application, and any third party LTI tools. The LMS can interact directly with the user and the LTI tool provider. Third party LTI tools can interact directly with the user and the LTI tool provider. Within the learning application, the LTI tool provider, LTI tool consumer, and backend dashboard can communicate with the data through an internal API which uses the learning application's service layer. The data that the LMS, LTI tool provider, and learning application use can be stored in digital storage. Digital storage includes a local or remote hard drive, server storage, memory, cloud storage, removable-media storage, or any other device known in the art to store computer-readable data.

An exemplary use and function of the system is described below.

Figure 4:
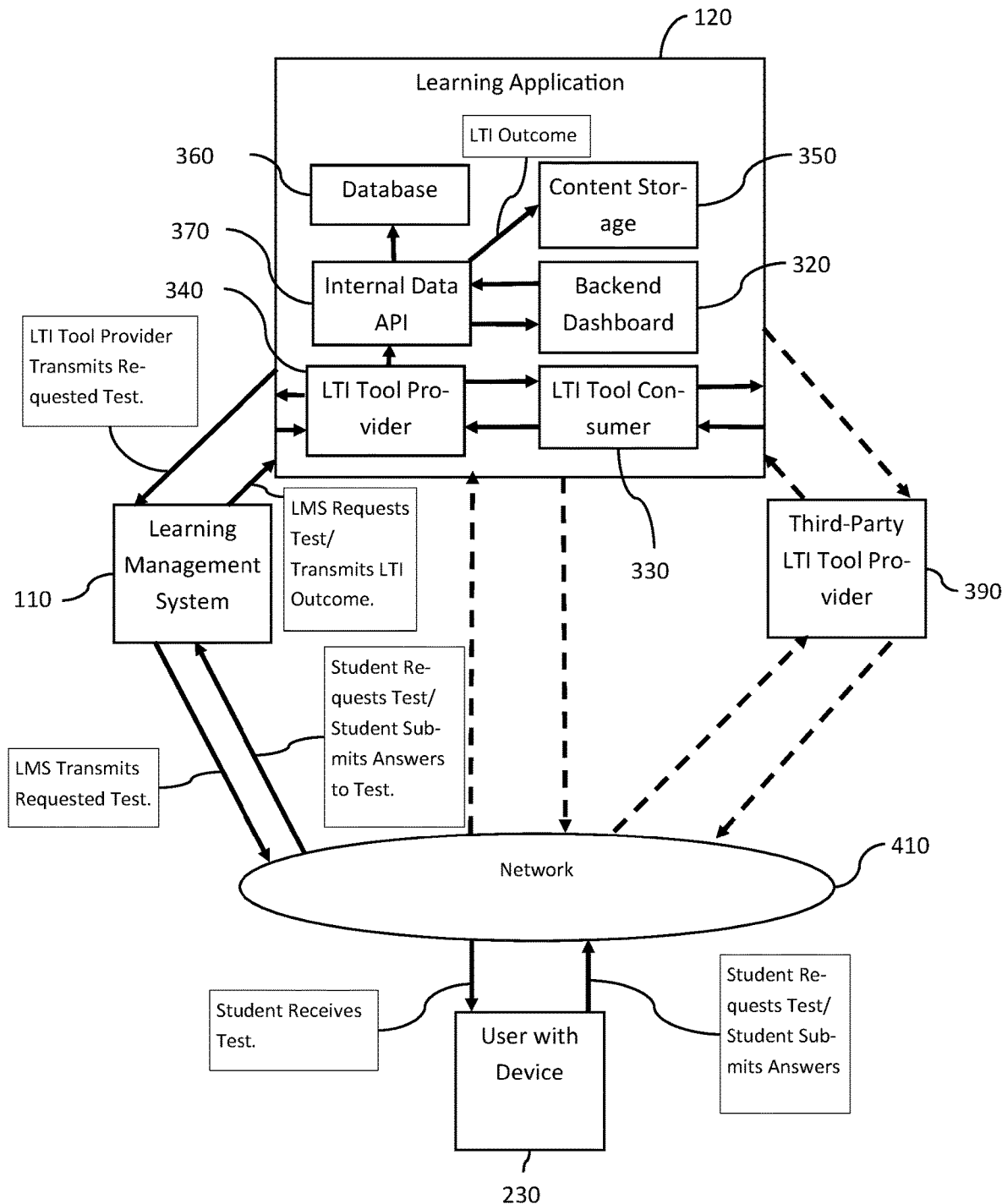
FIG. 4 shows an embodiment of the system illustrating data flow between components of the system when a user accesses a test through an LMS.

In reference to FIG. 4, the system can have a learning management system (LMS) 110, a learning application 120, and a third party Learning Tools Interoperability (LTI) tool provider 390. The LMS 110 can interact with the learning application 120 and a user 230. The user 230 can interact with the LMS 110, the learning application 120 and the third-party tool provider 390. The third-party tool provider 390 can interact with the user 230 and the learning application 120.

The LMS 110 can be an application that provides an online classroom environment in which students interact with professors and each other, take tests, and submit assignments. The LMS 110 application can be accessed with a personal computer, tablet, smart phone, or mobile phone. Professors and students can interact with the LMS 110, through their devices, over a communications network 410, such as the world wide web, wide area network (WAN), or local area network (LAN).

For example, a professor may interact with the LMS 110 using a personal computer connected to a LAN, the LAN serving as a gateway to the internet. The professor may interact with a student by opening a chat window and sending a message addressed to a student. The professor may also create a test, also referred to as an assessment, and store it on the LMS 110.

As a further example, a student can access the LMS 110 using a smart phone, the smart phone connecting to a wireless network and the wireless network a gateway to the internet. The student can view and interact with the LMS 110 to check what assignments have been assigned to them, complete said assignments, send a message to a fellow student or a professor, or complete a test.

A learning application 120 can have a database 360, content storage 350, internal data API 370, backend dashboard 320, LTI tool provider 340, and LTI tool consumer 330. The learning application 120 can interact with the LMS 110 and vice versa. The LMS 110 and the learning application 120 can be on the same server or separate servers. The LMS 110 can interact with the learning application 120 by requesting content from the LTI tool provider 340. The LTI tool provider 340 can provide learning tools to the LMS 110 upon a request sent by the LMS 110 to the LTI tool provider 340. From the learning tools, the professor can create a comprehensive learning program 610. For example, the LTI tool provider 340 can provide, but is not limited to only providing, lectures, presentations, surveys, interactive learning environments, and tests to the LMS 110 upon request sent by the LMS 110 to the LTI tool provider 340. The student can request a test 150 from the LMS 110, the LMS 110 requesting the test 150 from the LTI tool provider 340. Upon receipt of a test 150 by the LMS 110 from the LTI tool provider 340, the LMS 110 can display the test 150 on the student's device.

Upon completion of the test 150 by the student, the LMS 110 can produce an LTI outcome. This outcome can be created by the LMS 110 as a result of the responses used to complete the test. For example, a student can use their device to complete a test 150 comprised of questions. Completion of the test 150 can include providing answers responsive to each of the questions. The LMS 110 can then compare the responsive answers to a grading key. Answers that match the grading key can be considered correct while answers that do not, can be considered incorrect. The percentage of correct answers along with other data such as time used to complete the test, total number of answers given by the user, total number of questions, and number of attempts at a test can be included in the LTI outcome. Upon creation of the LTI outcome, the LMS 110 can transmit the LTI outcome to the LTI tool provider 340 in the learning application 120. The LTI tool provider 340, upon receipt of LTI outcome, can send the LTI outcome to an internal data API 370 in the learning application 120. Upon receipt of an LTI outcome, the internal data API 120 can augment and send the LTI outcome to the content storage 350 in the learning application 120.

The student can also interact directly with the learning application 120 through a browser on their device. The student can interact with the LTI tool provider 340 of the learning application 120. The LTI tool provider 340 can transmit a request to the LTI tool consumer 350 of the learning application 120 to play an LTI tool. The LTI tool consumer 330 can then request LTI content from a third-party LTI tool provider 390. In response, the third party LTI tool provider 390 can transmit LTI content to the LTI tool consumer 330, which in turn can transmit LTI content to the LTI tool provider 340, further in turn transmitting LTI content to the user 230 through the user's device.

Figure 5:
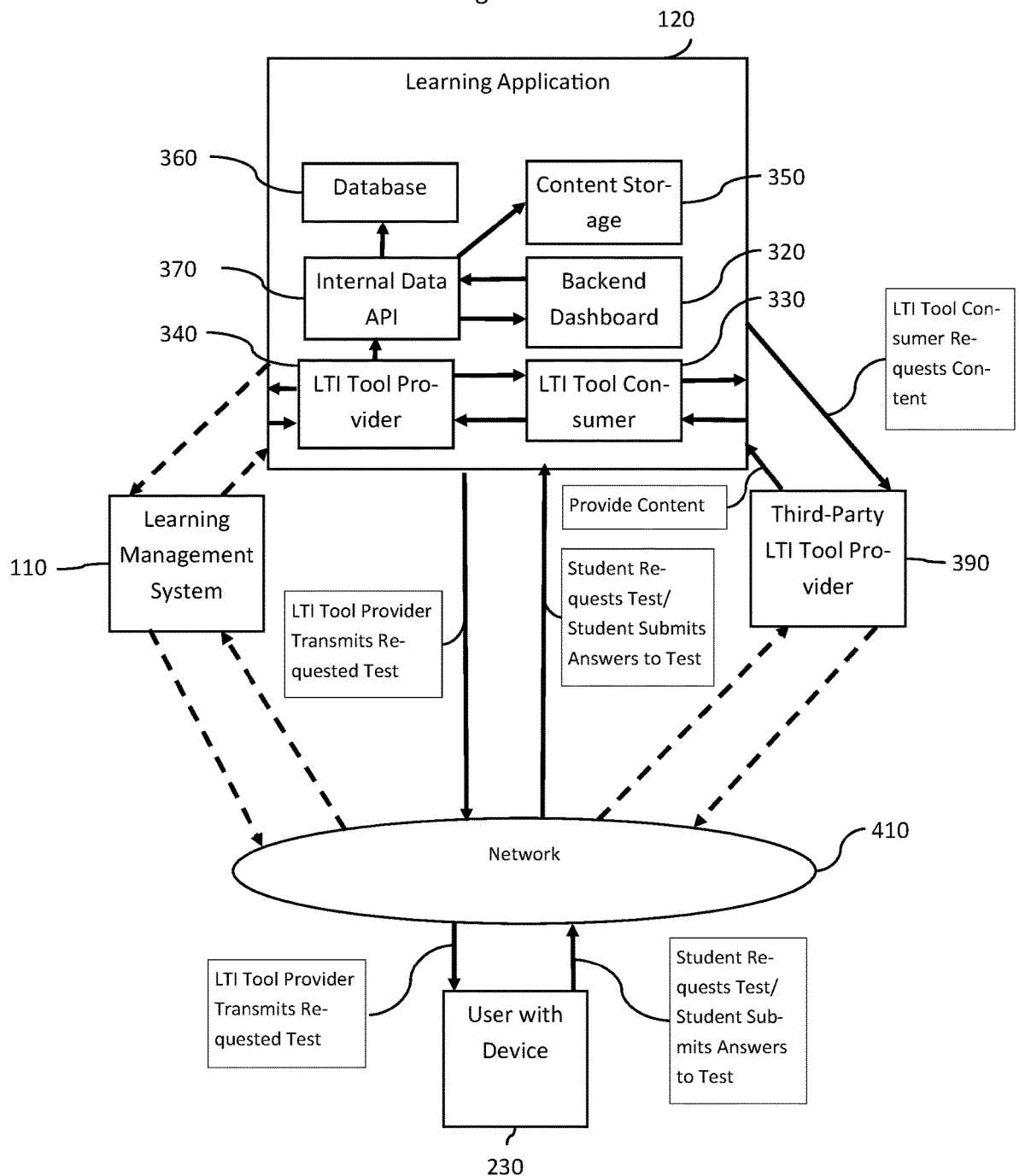
FIG. 5 shows an embodiment of the system illustrating data flow between components of the system when a user accesses a test through interaction with the learning application.

For example, in reference to FIG. 5, the user 230 can use an internet browser on their smart phone to communicate with the LTI tool provider 340 of the learning application 120, the communication being initiating the start of a test 150. The LTI tool provider 340 can transmit a request to the LTI tool consumer 330 to play the test 150. The LTI tool consumer 330 can then transmit a request to a third-party LTI tool provider 390 to transmit the third-party LTI content, in this example, the test 150. The third-party LTI tool provider 390 can then transmit the test 150 to the LTI tool consumer 330, the LTI tool consumer 330 then playing the test 150 and transmitting the test 150 to the LTI tool provider 340. The LTI tool provider 340 can then display the test 150 on the user's device and accept answers responsive to the displayed test 150.

Figure 6:
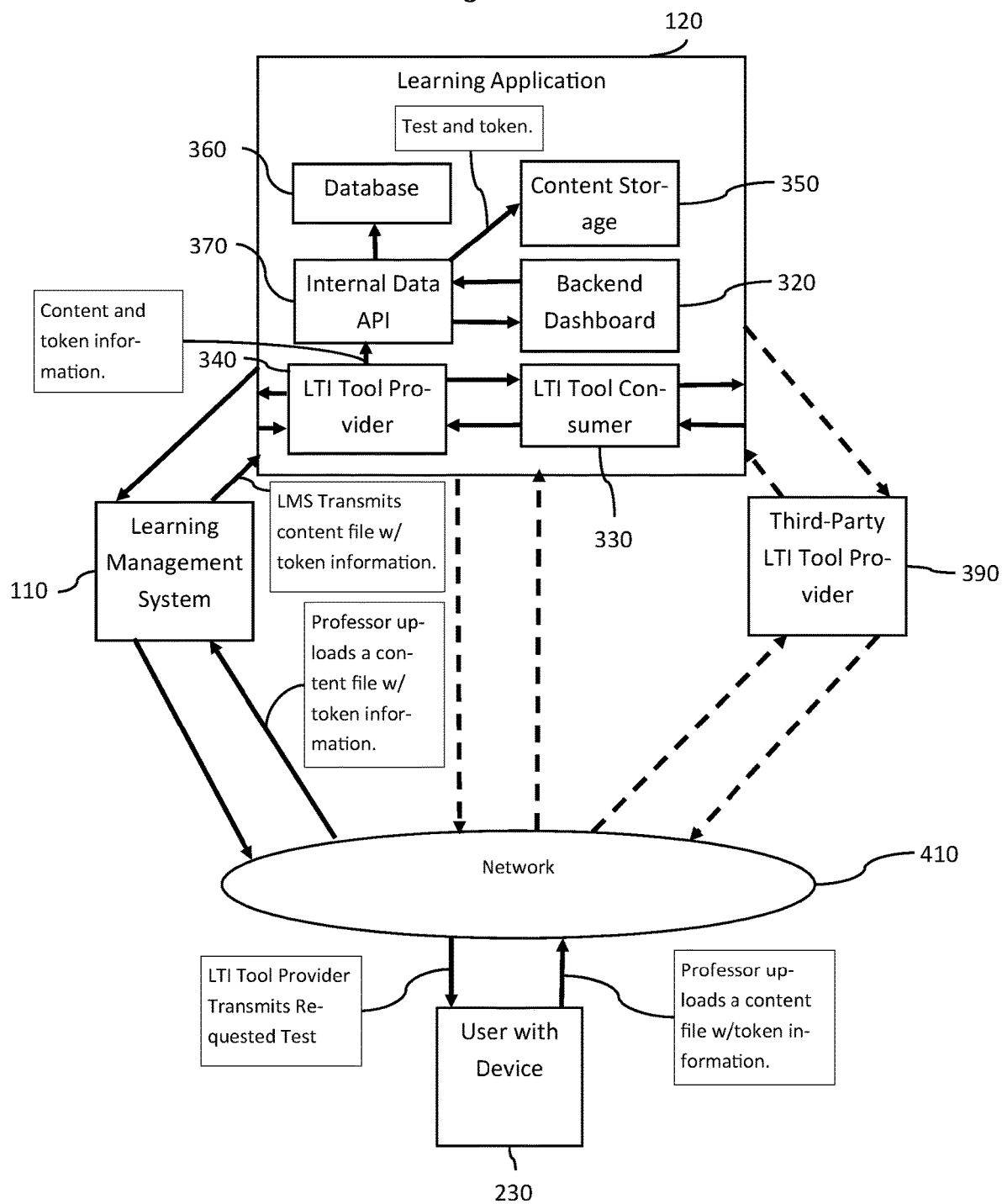
FIG. 6 shows an embodiment of the system illustrating data flow between components of the system when a user creation of a test.
Figure 7:
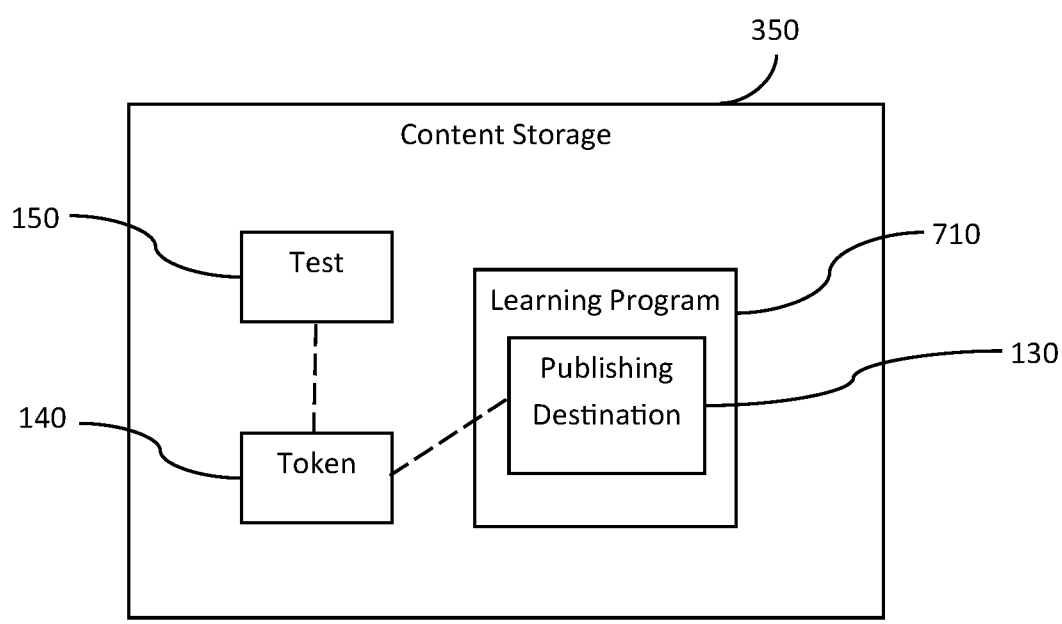
FIG. 7 illustrates an embodiment of the relationship between a token and a test in content storage of the system.

In reference to FIGS. 6 and 7, a professor can interact with the LMS 110 and learning application 120 to create a test 150. Instead of directly inserting the test 150 into the comprehensive learning program 710, the LMS 110 and learning application 120 allow a professor to insert a token 140 into a publishing destination 130 in the comprehensive learning program 710. The professor can map the token 140 to a test 150 and vice versa. The token 140 can then be mapped to a publishing destination 130 and vice versa. When a student accesses the comprehensive learning program 710, the test 150 mapped to the token 140 in the publishing destination 130 of the comprehensive learning program 710 in the learning application 120 will be displayed for the student to complete on their device.

A token 140 can be mapped to only one test 150 at a time. The token 140 may be remapped to a different test 150 at any time. Further, multiple tokens 140 can be mapped to a single test 150. This is particularly useful in the case of multiple comprehensive learning programs 710 being created but using the same test 150. When a test 150 is replaced with another, the system can allow the professor to simply transfer the tokens 140 mapped to the previous test 150 to the new test 150. This can allow the professor to avoid the burden of replacing every instance of the test 150 in every comprehensive learning program 710 individually in the learning application 120.

A test 150 can be created in the learning application 120 by uploading a content file. The learning application 120 can analyze the content file by using artificial intelligence, preprogrammed algorithms, natural language processing or any combination of these methods and those known in the art that allow a computer to interpret content and arrange it in a test form. For example, a professor can upload a file containing all of the subject matter that they wish to test students on. This content can include text, pictures, video, any combination of these, or any other human or computer readable media.

With the content file, the professor can upload specifications for the system to use to create the test 150. These specifications can include, but are not limited to, the number of questions, the type(s) of questions, the projected time a test-taker should use to complete the exam, the targeted average grade obtained by a group of test-takers, the general subject area(s) of the test 150, whether the test 150 is a practice test or a test for credit, whether the test 150 is graded, what token(s) 140 the test 150 will be mapped to, any combination of these parameters, and any other parameter known in the art that specifies the structure of a test.

After the test 150 is created, the system can map the test 150 to tokens 140 specified during, after, or both during and after the creation of the test 150. The system can automatically map the test 150 to a token 140 or multiple tokens 140 that were specified by uploaded parameters before the test 150 was created. The system can also prompt the test creator during or after the test creation for tokens 140 that the test 150 can be mapped to. Subsequently, the system can map the test 150 to tokens 140 identified by responsive information to the prompts.

The system can store the test 150 and token 140 information in the content storage 350 or the database 360.

Another exemplary use of the teachings described herein is described below.

In reference to FIGS. 6 and 7, a professor can create a comprehensive learning program 710 for a chemistry class. The learning program 710 can be in a learning application 120 which is accessed by an LMS 110. The learning program 710 can include a series of learning tools which can include, but are not limited to, presentations, lectures, surveys, homework assignments, interactive learning environments, and tests 150 (assessments). The presentation and lectures can be different lectures regarding individual subjects in chemistry, such as elements, molecules, covalent bonds, ionic bonds, chemical naming conventions, and reactivity. A student can access the LMS 110 with a smart phone, through a wireless network and the internet, to view the lectures and presentations according to a class curriculum. The professor can access the LMS 110 through a laptop computer, through a wireless network and the internet, to upload, arrange, or create the learning tools for the learning program 710.

As part of the learning program 710, the professor can designate assignments to be completed subsequent to lectures and presentations. The student can complete the assignments by accessing the LMS 110 as described above.

Also as part of the learning program 710, the professor can assign interactive learning environments including, but not limited to, lab simulation programs or molecule builders. The student can access the interactive learning environments by accessing the LMS 110 as described above.

The professor can create a test 150 by uploading content and parameters to the LMS 110. Content and parameters can be in separate files, or the same file. In this example, the content can include materials showing covalent bonds, examples of molecules that have covalent bonds, model questions of what the test related to covalent bonds should look like, specific molecules to include in the test 150, and text describing the covalent bond material in detail. Parameters can include that the number of questions required is 20, the questions are to be multiple choice, the number of choices for each questions is to be 4, the projected completions time of the test 150 is 60 minutes, and the targeted median grade of a group of test-takers is a 85%. With this information, the system can then create a test 150 after using natural language processing and artificial intelligence to interpret the content and arrange it into a test meeting the parameters.

Figure 8:
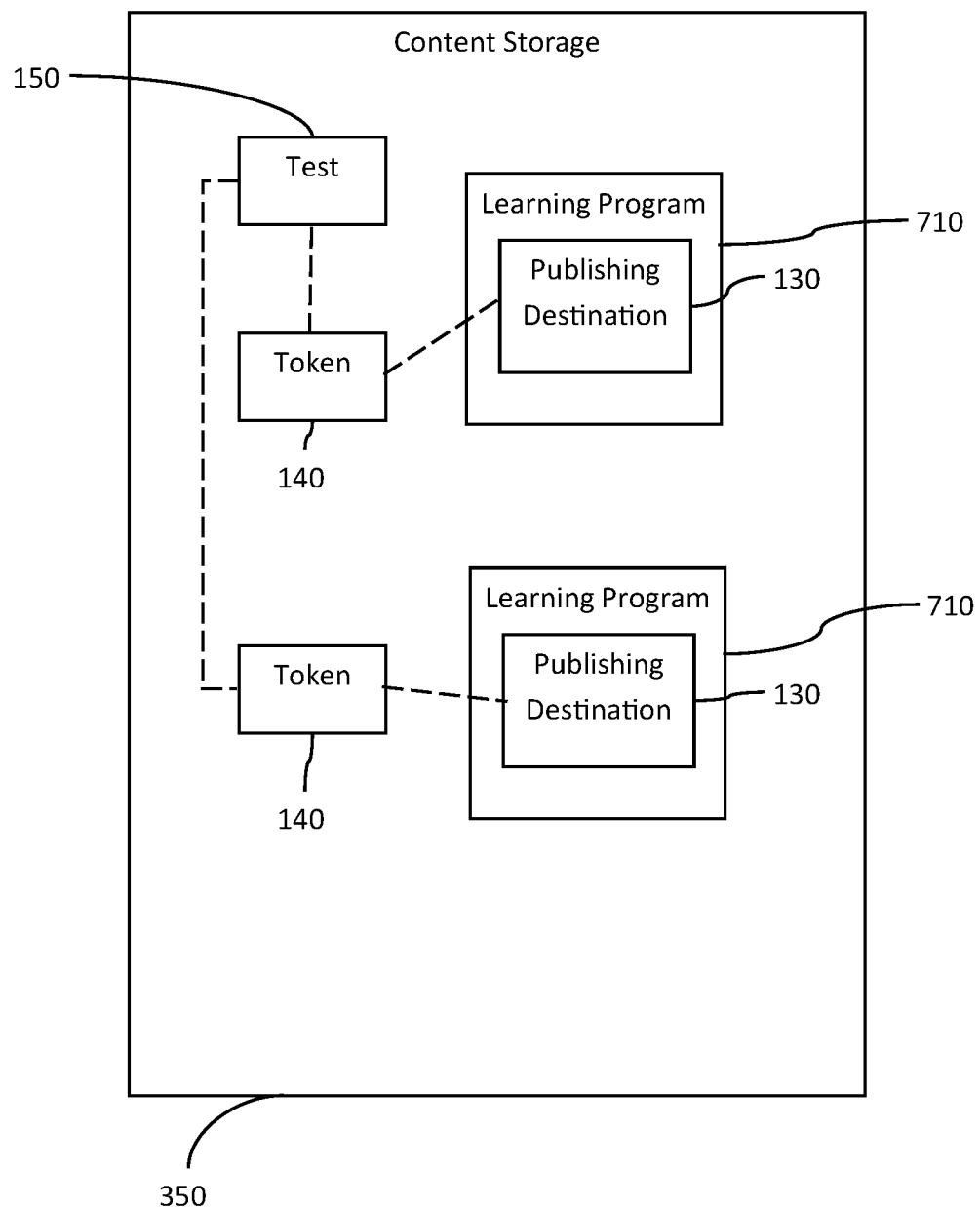
FIG. 8 illustrates an embodiment of the relationship between a single test with multiple tokens and multiple learning programs in content storage of the system.

After the test 150 is created, the system can then prompt the professor to specify which tokens 140 to map the test 150 to. The professor can provide information identifying existing tokens 140, or create new tokens 140 to map to locations in comprehensive learning programs. The system can then map the test 150 to the tokens 140 specified. In this example and in reference to FIG. 8, the professor can specify tokens 140 in multiple comprehensive learning programs 710 such as those in a Chemistry I and a Chemistry II learning programs. This mechanism allows the created test 150 to be associated with multiple comprehensive learning programs 710 without the burden of embedding the test 150 in each learning program 710 individually.

While the present teachings have been described above in terms of specific embodiments, it is to be understood that they are not limited to these disclosed embodiments. Many modifications and other embodiments will come to mind to those skilled in the art to which this pertains, and which are intended to be and are covered by both this disclosure and the appended claims. It is intended that the scope of the present teachings should be determined by proper interpretation and construction of the appended claims and their legal equivalents, as understood by those of skill in the art relying upon the disclosure in this specification and the attached drawings.

What is claimed is:

1. A learning system, comprising:
   a server;
   a learning application executing on the server, the learning application built using the Learning Tools Interoperability Standard (LTI);
   an educational assessment executed by the learning application and configured to assess the abilities of a first user based upon inputs from the first user and to output an educational assessment outcome to the learning application;
   a token embedded in the learning application by adding the token to a learning application file, the token being configured to store information regarding the educational assessment;
   the learning application reading the information stored in the token, determining the educational assessment assigned to the token based upon the information stored in the token, and executing the educational assessment assigned to the token, such that the educational assessment assigned to the token can be changed without moving or modifying the learning application;
   the learning application receiving the educational assessment outcome, producing a learning application outcome based upon at least the educational assessment outcome, and outputting the learning application outcome to a learning management system;
   the learning management system executed on the server and generating a report using the learning application outcome.

2. The learning system of claim 1, wherein information identifying a location of the educational assessment is stored in the token; and
   wherein the learning application uses the information identifying the location of the educational assessment to retrieve the educational assessment from a digital storage.

3. The learning system of claim 1, wherein the information regarding the educational assessment is stored in multiple tokens, the learning application reading the information in at least a first token and a second token.

4. The learning system of claim 1, further comprising the learning management system, which interacts with the learning application.

5. The learning system of claim 4, wherein the learning application has an LTI tool provider;

the learning management system interacts with the learning application through the LTI tool provider.

6. The learning system of claim 5, wherein the learning management system transmits content requests to the LTI tool provider.

7. The learning system of claim 5, wherein the learning management system receives outcomes from the LTI tool provider.

8. The learning system of claim 1, further comprising:
   a second educational assessment executed by the learning application and configured to assess the abilities of the first user based upon inputs from the first user, the second educational assessment outputting a second educational assessment outcome to the learning application;
   a second token, the second token configured to store information regarding the second educational assessment;
   the learning application reading the information stored in the second token, determining the educational assessment assigned to the second token based upon the information stored in the second token, and executing the educational assessment assigned to the second token, such that the educational assessment assigned to the second token can be changed without moving or modifying the learning application;
   the learning application receiving the second educational assessment outcome, producing a second learning application outcome based upon at least the second educational assessment outcome, and outputting the second learning application outcome to the learning management system.

9. A learning system, comprising:
   a server;
   a storage;
   a content file stored in the storage, the content file including materials related to an assessment subject matter;
   a learning application executing on the server, the learning application built using the Learning Tools Interoperability Standard (LTI), the learning application analyzing the content file to determine the assessment subject matter stored therein;
   an application programming interface executed in the learning application, the application programming interface creating an educational assessment based on an assessment framework and the content file;
   the educational assessment including at least one question and at least one place for an input responsive to the at least one question;
   the application programming interface storing the educational assessment in a database;
   wherein the learning application links the educational assessment to a learning program without embedding the educational assessment into the learning program by inserting at least one token in at least one publishing location of the learning program, the at least one token mapping to the educational assessment stored in the database.

10. The learning system of claim 9, wherein the educational assessment, when executed in the learning application, accepts the input responsive to the at least one question and stores the input in the database.

11. The learning system of claim 10, wherein the educational assessment stores the input in the database using a single script function.

12. The learning system of claim 10, wherein the learning application compares the input stored in the database to a grading key and determines an assessment outcome based upon the comparison;

the learning application stores the assessment outcome in the database.

13. The learning system of claim 9, wherein the application programming interface retrieves the educational assessment from the database and transmits the educational assessment to an LTI tool provider.

14. The learning system of claim 13, wherein the LTI tool provider transmits the educational assessment to a learning management system.

* * * * *